United States Patent
Flemings et al.

(10) Patent No.: US 11,022,709 B2
(45) Date of Patent: Jun. 1, 2021

(54) PORE-PRESSURE PREDICTION BASED ON VELOCITIES COUPLED WITH GEOMECHANICAL MODELING

(71) Applicant: BOARD OF REGENTS, THE UNIVERSITY OF TEXAS SYSTEM, Austin, TX (US)

(72) Inventors: Peter Flemings, Austin, TX (US); Maria Nikolinakou, Austin, TX (US); Mahdi Heidari-Moghadam, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 660 days.

(21) Appl. No.: 15/551,472

(22) PCT Filed: Feb. 22, 2016

(86) PCT No.: PCT/US2016/018971
§ 371 (c)(1),
(2) Date: Aug. 16, 2017

(87) PCT Pub. No.: WO2016/134376
PCT Pub. Date: Aug. 25, 2016

(65) Prior Publication Data
US 2018/0067220 A1 Mar. 8, 2018

Related U.S. Application Data

(60) Provisional application No. 62/118,713, filed on Feb. 20, 2015.

(51) Int. Cl.
*G01V 1/30* (2006.01)
*G01V 1/28* (2006.01)

(52) U.S. Cl.
CPC .............. *G01V 1/306* (2013.01); *G01V 1/282* (2013.01); *G01V 2210/622* (2013.01); *G01V 2210/6222* (2013.01); *G01V 2210/6248* (2013.01)

(58) Field of Classification Search
CPC .. G01V 1/282; G01V 1/306; G01V 2210/622; G01V 2210/6222;
(Continued)

(56) References Cited

U.S. PATENT DOCUMENTS 9,910,938 B2 * 3/2018 Morales German .... G06F 30/20
2007/0288170 A1 12/2007 Sayers et al.
(Continued)

OTHER PUBLICATIONS

International Search Report and Written Opinion issued in the related International Application No. PCT/US2016/018971 dated Apr. 25, 2016.

Ferronato, et al: "Geomechanical issues of anthropogenic CO2 sequestration in exploited gas fields", Energy Conservation and Management, vol. 51, No. 10, Oct. 1, 2010, pp. 1918-1928, XP027057105.

(Continued)

*Primary Examiner* — Cedric Johnson
(74) *Attorney, Agent, or Firm* — Meunier Carlin & Curfman LLC (57) ABSTRACT

Disclosed herein are methods for predicting pore pressure in geological environments. Aspects of the disclosure describe details relating to performing geomechanical modeling for a target location in order to obtain a surrogate stress at the target location and predicting pore pressure by coupling velocity data (e.g., seismic and/or sonic) with the surrogate stress. Aspects of the disclosure can be used to obtain improved predictions of pore pressure in subsurface environments, especially in basins with complex geologic histories, and in practice to improve the safe design of casing, wellbore trajectory, and overall borehole stability.

18 Claims, 9 Drawing Sheets

(58) Field of Classification Search
CPC ...... G01V 2210/6248; G02B 2027/014; G02B 2027/0145; G02B 27/0103; G02B 27/017; G06F 3/012; G06F 30/00; G06T 19/003; H04N 5/04; H04N 5/0736
USPC ...................................................... 703/10, 6
See application file for complete search history.

(56) References Cited

U.S. PATENT DOCUMENTS

| | | |
|---|---|---|
| 2008/0033656 A1 | 2/2008 | Herwanger et al. |
| 2008/0319675 A1 | 12/2008 | Sayers |
| 2010/0191511 A1* | 7/2010 | Hsu ................... E21B 49/006 703/1 |
| 2010/0250206 A1 | 9/2010 | Yogeswaren et al. |
| 2010/0250214 A1 | 9/2010 | Prioul et al. |
| 2011/0011595 A1 | 1/2011 | Huang et al. |
| 2011/0170373 A1 | 7/2011 | Hsu et al. |
| 2014/0278298 A1 | 9/2014 | Maerten |

OTHER PUBLICATIONS

Yaghoubi, et al: "Determination of magnitude and orientation of the in-situ stress from borehole breakout and effect of pore pressure on borehole stability—Case study in Cheshmeh Khush oil field of Iran", Journal of Petroleum Science and Engineering, vol. 67, No. 3-4, Aug. 1, 2009, pp. 16-126, XP026266008.

Extended European Search Report issued for Application No. 16753230.8, dated Sep. 18, 2018, 10 pages.

Luo, et al., 2012, Geomechanical modeling of stresses adjacent to salt bodies: Part 1—Uncoupled models, American Association of Petroleum Geologists Bulletin, vol. 96, No. 1, pp. 43-64.

Nikolinakou, et al., 2012, Geomechanical modeling of stresses adjacent to salt bodies: Part 2—Poroelastoplasticity and coupled overpressures, American Association of Petroleum Geologists Bulletin, vol. 96, No. 1, pp. 65-85.

Communication pursuant to Article 94(3) EPC dated Sep. 1, 2020, from related EP application No. 16753230.8, 6 pages.

* cited by examiner

Bower's equation (1995)

$V (ft/s) = 4930 + 14.26(\sigma'_v(psi))^{0.68}$ $V (Km/s) = 1.5 + 0.13(\sigma'_v(MPa))^{0.68}$

FIG. 6

FIG. 7A $\sigma'_m = \sigma_m - u$

FIG. 7B

Bower's equation (1995)
$V (ft/s) = 4930 + 5.73(\sigma'_m(psi))^{0.85}$
$V (Km/s) = 1.5 + 0.12(\sigma'_m(MPa))^{0.85}$

PORE-PRESSURE PREDICTION BASED ON VELOCITIES COUPLED WITH GEOMECHANICAL MODELING

CROSS REFERENCE TO RELATED APPLICATION

This application is a 371 of PCT/US2016/018971 filed Feb. 22, 2016, which claims priority to U.S. Provisional Patent Application No. 62/118,713, filed Feb. 20, 2015 and entitled "Pore-Pressure Prediction Based on Seismic Velocities Coupled with Geomechanical Modeling," the contents of which are herein incorporated by reference in their entirety.

BACKGROUND

The determination of pore pressure—i.e., the pressure of fluid within the pore spaces of a formation rock—is valuable in exploration and drilling operations. For example, the pressure applied by the column of drilling fluid should be able to resist the pore pressure to prevent well blowout. In addition, rapid penetration at an optimum drilling rate relies on the drilling fluid pressure being slightly greater than the pore pressure.

Fluid removal from a reservoir may have deleterious effects at the Earth's surface and subsurface. In situ fluids provide pore pressure counteracting the overburden and support the rock strata above the formation. The removal of fluids, particularly when the rock matrix in the subsurface reservoir is weak, can cause a reduction in pore pressure. When this occurs, the weight of the overburden may be increasingly supported by the rock matrix. This may cause a compaction of the subsurface formation in response to the increased stress. This can cause subsidence, the gradual caving in or sinking of an area of land. Thus, predicting the likelihood or extent of earth movement as a result of subsidence can be useful for avoiding environmental or hydrogeological harm.

Predicting local changes in the in-situ state of stress can be useful in gauging the impact of such changes on well integrity over the life of reservoir production. Subsidence has the potential of damaging production wells. Downward earth movement can create damaging compressional stresses on downhole equipment.

Drillers often observe pressure anomalies near salt bodies or within thrust belts that are not predicted by existing exploration tools. Non-hydrostatic pore pressures (pressures different than those present in a static body of water) can be dangerous when encountered unexpectedly during drilling operations. Overpressures in particular can lead to the violent escape of fluids up a well, causing potentially tragic consequences for human safety and the environment. On the other hand, underpressures can lead to loss of circulation of wellbore fluids (including hydrocarbons) into formations deep into the earth.

Pore-pressure perturbations can be caused by geologic actions such as horizontal shortening of basins or the movement of salt (a viscous rock in the subsurface). Current pore-pressure prediction workflows are based on the simplified assumption that basin sediments have not experienced any further loading/deformation in addition to their deposition (uniaxial strain). Therefore, the existing workflows often are not able to predict the presence of pressure anomalies. Moreover, proper prediction of pore pressure can improve designs for the most economic well path and ensure borehole stability.

Current methods assume that the stress field can be represented by one stress component representing the vertical stress. But this is only true in the case of uniaxial deposition (vertical addition of sediments, with no lateral deformation). In many exploration settings, additional geologic actions (e.g., thrust loading, salt emplacement) have modified components of the stress tensor.

Established industry workflows for pore-pressure prediction are usually based on the assumption of sedimentation as the loading agent, even though complex loading histories are typically encountered in drilling environments.

Therefore, systems and methods are needed to overcome these challenges in the present art and provide more accurate predictions of pore pressures.

SUMMARY

In one exemplary aspect of the disclosure, a method of predicting pore pressures in complex geologic settings is described. This method improves the pore pressure prediction in subsurfaces. It incorporates loading in all directions (e.g., both horizontal directions and the vertical direction), as well as the presence of shear (differential stress), to account for geologic processes other than sedimentation. It can be based on both velocity measurements (e.g., seismic and/or sonic) and geomechanical stress modeling. Furthermore, the method can be coupled with any geomechanical modeling packages. The method may be used by the upstream sector of the energy industry (e.g., explorationists and drillers) to obtain a more realistic prediction of pore pressure and of the stress conditions in subsurface hydrocarbon environments, especially in basins with complex geologic histories, such as thrust basins, and those proximate to salt bodies. Exemplary practical applications of the method include: 1) better prediction of pore pressures during the exploration stage, ahead of the drill bit (diagnosing pressure anomalies allows for the drilling density to be adjusted to compensate); 2) better overall prediction of borehole stability; 3) design of a casing plan; and 4) design of wellbore trajectory.

According to one non-limiting aspect of the disclosure, a method for predicting pore pressure in a subsurface geological environment is disclosed. The method can comprise the steps of receiving velocity data for a target volume; performing geomechanical modeling for the target volume; and determining pore pressure prediction values for the target volume by establishing a mathematical relationship between the velocity data with a surrogate stress obtained from the geomechanical modeling. The target volume comprises an array of measurement locations, and the geomechanical modeling includes obtaining the surrogate stress of a complete stress tensor at each measurement location within the target volume based on a geomechanical model. In certain implementations, the method may also include providing components of the complete stress tensor at the target volume in response to performing the geomechanical modeling for the target volume. And, in some implementations, the velocity data may include seismic and/or sonic velocity data.

In some implementations, determining the prediction of pore pressure values comprises calculating a difference between a total stress component and an effective stress component for each measurement location, wherein each of the effective stress components is calculated as a function of a surrogate effective stress component at the respective measurement location. In addition, in certain implementations, determining the prediction of pore pressure values comprises analyzing loading data having both non-zero horizontal and vertical components that are independent from each other, as well as shear components.

In one exemplary aspect of the disclosure, the subsurface can comprise a hydrocarbon, a gas environment, a liquid storage environment, or a gas storage environment. Moreover, the geological environment can comprise environments that are characterized by having a stress tensor that has stress components in three directions (e.g., two horizontal and one vertical) that are independent from each other, as well as shear components. In addition, in some implementations, the geomechanical modeling comprises analyzing loading history data and generating simulated response data of the geological environment based on the loading history data.

In another exemplary aspect of the disclosure, the geological environment can comprise at least one basin with a complex geologic history. The geological environment can further comprise, for example, a salt body, a shale formation, a continental margin slope, an extensional terrain, a fault zone, normal faults, reverse faults and strike/slip zones, a thrust belt, a folded area, a fractured area or unconformities, among other examples that may be well known to someone of ordinary skill in the art. In addition, in some implementations, each step is performed with respect to multiple target locations forming a target field.

According to another non-limiting aspect of the disclosure, a non-transitory computer-readable storage medium is disclosed having computer-executable instructions stored thereon for predicting pore pressure in a subsurface geological environment, that, when executed by a computing device, cause the computing device to: receive velocity data for a target volume; perform geomechanical modeling for the target volume; and determine a prediction of pore pressure values at the target volume by establishing a mathematical relationship between the velocity data with a surrogate stress obtained from the geomechanical modeling. The target volume comprises an array of measurement locations, and the geomechanical modeling includes obtaining the surrogate stress of a complete stress tensor at each measurement location within the target volume based on the geomechanical model. In certain implementations, the non-transitory computer-readable storage medium may also include computer-executable instructions stored thereon that, when executed by the computing device, cause the computing device to provide the components of the complete stress tensor at the target volume in response to performing the geomechanical modeling for the target volume. And, in some implementations, the velocity data may include seismic and/or sonic velocity data.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Stress can be defined as the force over area applied to a body that can result in deformation, or strain. Stress can be described, for example, in terms of magnitude per unit of area. In this respect, stress can serve as a measure of the internal forces in a body between its constituent particles, as they resist separation, compression or sliding in response to externally applied forces.

A surrogate stress can be defined as a single stress component that is assumed to be representative of the whole stress tensor. For example, the surrogate stress may include a vertical effective stress, a mean effective stress, or an equivalent effective stress. The surrogate stress can be a single data point (or value) or a vector having magnitude and direction.

The external load applied to a formation defines the total stress. Effective stress can be defined as the difference between total stress and pore pressure. Effective stress is the portion of the total stress that is carried by the rock itself. Properties such as velocity, porosity, density, resistivity, and strength can be described in terms of effective stress. It is also possible to determine the effective stress from measurements of physical properties such as velocity or resistivity. Moreover, effective stress can govern the frictional strength of faults and the permeability of fractures. All normal (i.e., non-shear) components of the stress tensor may have an effective component; for example the vertical effective stress is obtained as the difference between the vertical total stress and the pore pressure; the horizontal effective stress is obtained as the difference between the horizontal total stress and the pore pressure; the mean effective stress is obtained as the difference between the mean total stress and the pore pressure.

Pore pressure can be defined as the pressure of fluids within the pores of a geologic formation. In the absence of any other processes, the pore pressure is equal to the weight of the overlying fluid (the pressure exerted by a column of water from the formation's depth to sea level); this is called hydrostatic pressure. Any external load may result in change of the volume of the formation, including change of the volume of pores. Because pore fluid is relatively incompressible, any pore volume change would eventually result in flow of fluids either out of the pores (if load tends to decrease the pore volume) or towards the pores (if load tends to increase the pore volume). When the permeability of sediments is low, pore fluid flow is restricted. For example, pore fluids cannot always escape fast enough to respond to an imposed decrease in the pore volume. Because pore fluids cannot practically deform, they respond to the imposed load by changing their pressure. They develop overpressures (pressures higher than hydrostatic at a given depth) when the load tends to decrease the pore volume or underpressures (pressures lower than hydrostatic at a given depth) when the load tends to increase the pore volume. Any pressure in excess of the hydrostatic pressure helps support part of the overlying rock column.

Several processes can cause the pore pressure to be different from hydrostatic pressure. Processes that increase pore pressure may include: under compaction caused by rapid burial of low-permeability sediments, lateral compression, shear-induced compression, rapid loading, the release of water from clay minerals caused by heating and compression, the expansion of fluids because of heating, fluid density contrasts (centroid and buoyancy effects), and fluid injection. Processes that decrease pore pressure can include: fluid shrinkage, extensional loading, unloading rock dilation, and reservoir depletion.

Pressure anomalies are characterized by pressure values that are either higher (overpressure) or lower (underpressure) than hydrostatic pressures. Drilling into overpressured strata can be hazardous because overpressured fluids escape rapidly. Underpressure, or a zone of underpressure, can be common in areas or formations that have had hydrocarbon production. Underpressures can be costly because they can lead to loss of circulation of wellbore fluids (including hydrocarbons) into formations deep into the earth.

Basins can be defined as a depression in the crust of the earth, caused by plate tectonic activity and subsidence, in which sediments accumulate. Example geometries of sedimentary basins are bowl-shaped or elongated troughs. Basins can be bounded by faults. If rich hydrocarbon source rocks occur in combination with appropriate depth and duration of burial, then a petroleum system can develop within the basin.

Thrust faults can refer to a type of fault, or break in the earth's crust across which there has been relative movement, in which rocks of lower stratigraphic position are pushed up and over higher strata. Thrust faults can be the result of compressional forces.

Boreholes can be defined as narrow shafts bored in the ground, either vertically or horizontally, or at any direction. A borehole may be constructed for many different purposes, including the extraction of water or other liquids (such as petroleum) or gases (such as natural gas), as part of a geotechnical investigation, environmental site assessment, mineral exploration, temperature measurement, as a pilot hole for installing piers or underground utilities, for geothermal installations, or for underground storage of unwanted substances.

Figure 1:
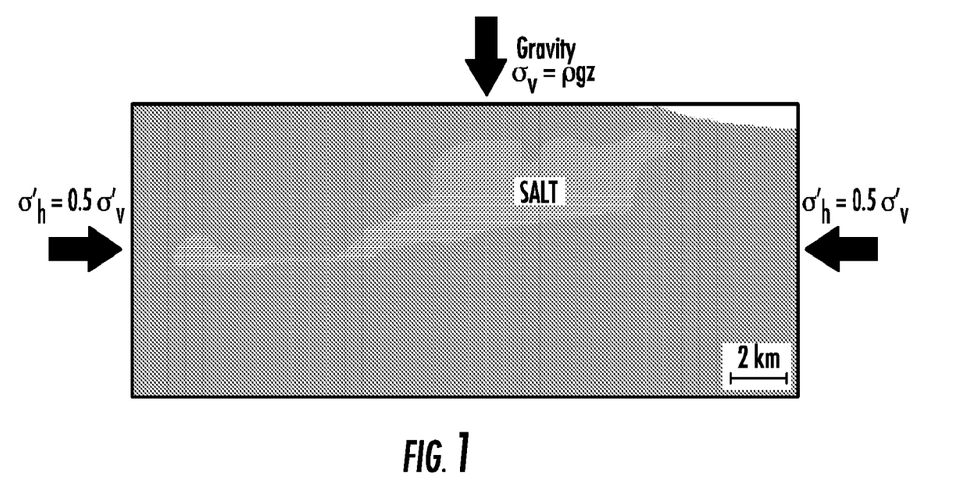
FIG. 1 shows an exemplary geomechanical model set up that can be used to obtain the total surrogate stress across the target location field, according to one implementation.

FIG. 1 shows an example of a geomechanical model set up that can be used to obtain the complete total stress tensor (including mean total stress and shear stress) across the target location field (or volume). The use of a geomechanical model incorporates the geologic loading history data and the behavior or response of the geological environment into the stress prediction.

Figure 2:
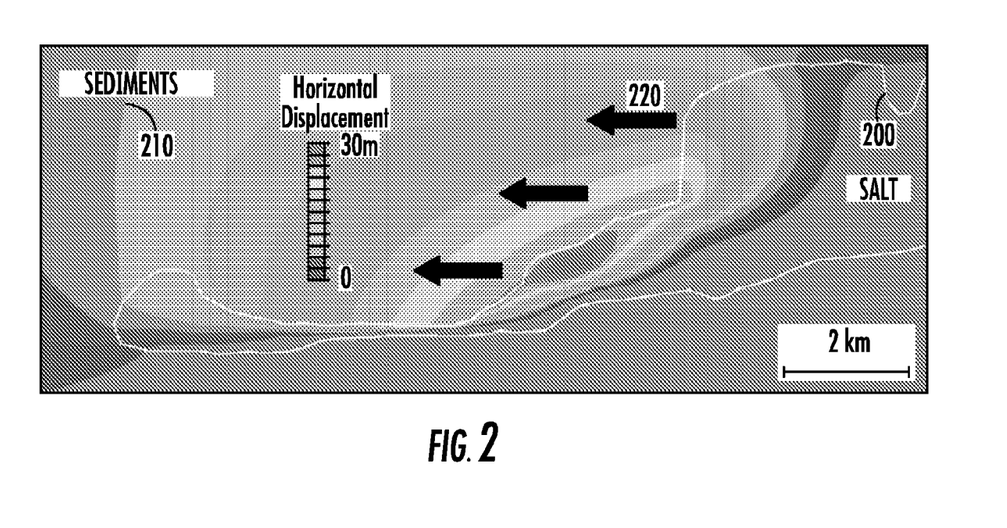
FIG. 2 shows exemplary results from the geomechanical model shown in FIG. 1.

FIG. 2 shows exemplary results of the response of the geological environment of the geomechanical model shown in FIG. 1. Here, the contours show horizontal displacement and illustrate that the salt body 200 (shown within the white line) deforms laterally into the sediment 210 (outside of the white line), subjecting the sediment 210 to thrust loading 220, leading to an increase in the horizontal stress. This happens because the overburden stress cannot arch around salt. This results in salt isotropic stress being increased to the lithostatic stress value. Increases in the horizontal stress within the salt body 200 lead to outward horizontal displacements. Consequently, lateral salt deformation loads sediments 210 along inclined salt-sediment interfaces, and horizontal stress increases within mini-basins and in front of the salt body 200.

Figure 3:
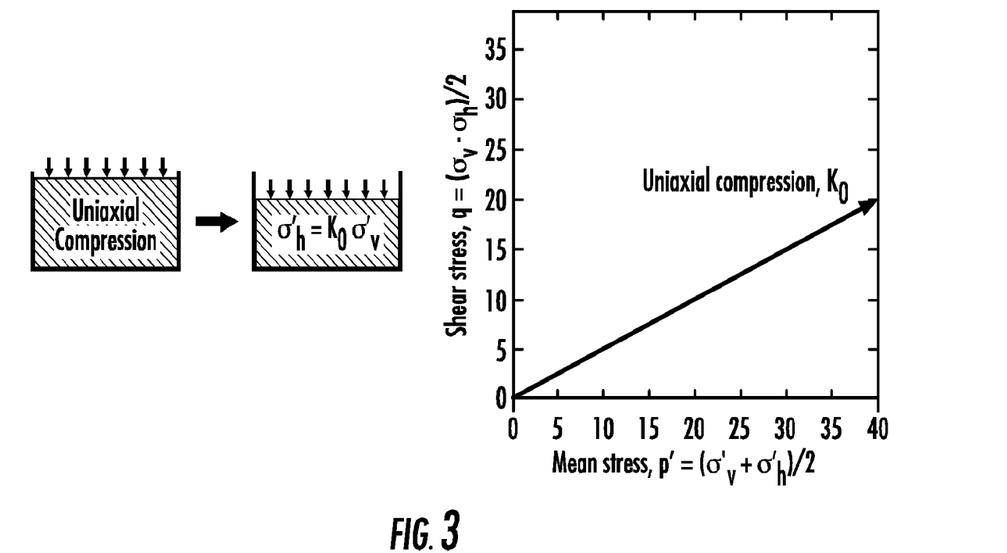
FIG. 3 is a schematic showing uniaxial deposition/compression, according to one implementation.

FIG. 3 illustrates a schematic showing uniaxial deposition/compression. When sediments are deposited vertically and no lateral deformation can take place, the horizontal effective stress develops as a ratio of the vertical effective stress. Hence, horizontal and vertical effective stresses may be interrelated and therefore vertical effective stress ($\sigma'_v$) can represent the stress state during uniaxial deposition/compression. For purposes of the graph, the shear stress can be defined as the component of stress coplanar with a material cross section. It can also be defined as the differential stress between stress components (e.g., the difference between vertical and horizontal stress). Shear stress can arise from the force vector component parallel to the cross section.

Figure 4:
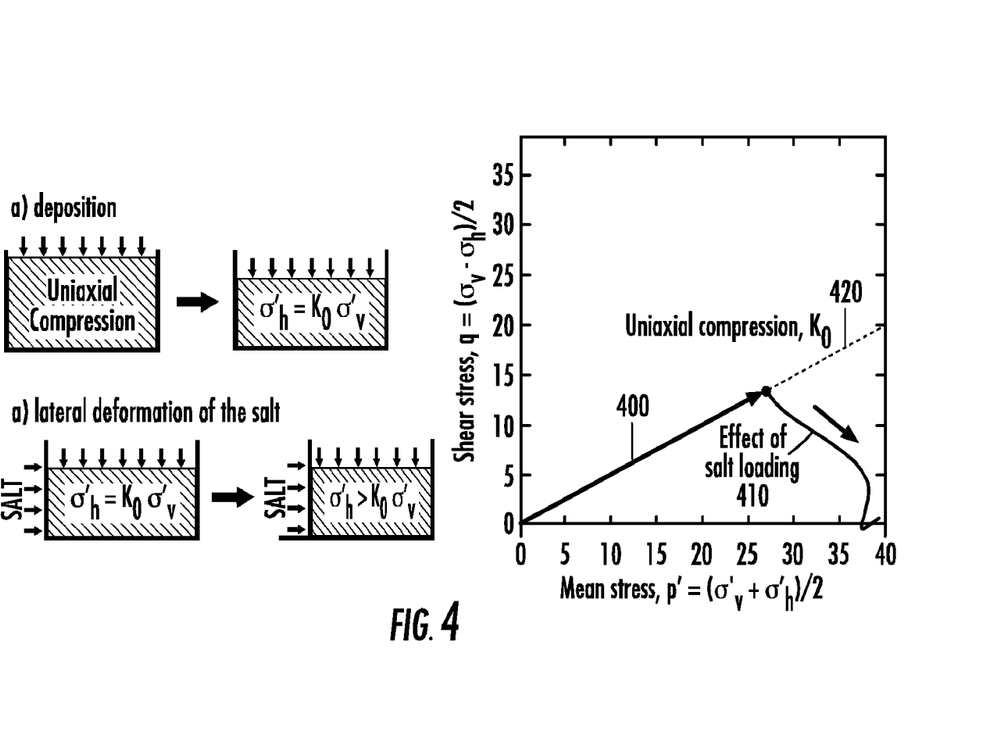
FIG. 4 is a schematic showing a more complex geologic environment than is shown in FIG. 3, wherein loading other than deposition has been applied to the sediments, according to one implementation.

FIG. 4 illustrates a schematic showing a more complex geologic environment, where loading other than deposition has been applied to the sediments. For example, the complex geological environment can comprise a salt body, a shale formation, a continental margin slope, an extensional terrain, a fault zone, normal faults, reverse faults and strike/slip zones, a thrust belt, a folded area, a fractured area, and unconformities. As shown in FIG. 3 and by line 400 of FIG. 4, during uniaxial deposition, horizontal effective stress is a fraction of the vertical effective stress. Mean stress and shear stress develop with a constant ratio, as indicated by lines 400 and 420. However, in an exemplary environment having a nearby salt body, the movement of salt over time loads sediments laterally. This load increases the horizontal stress and changes the shear stress. Thus, the value of the horizontal effective stress is independent from the vertical effective stress, and the ratio of shear stress q to mean effective stress ($\sigma'_m$) as shown by line 410, is different than the uniaxial ratio, as shown by lines 400 and 420. Therefore, in this more complex case, the vertical effective stress ($\sigma'_v$) cannot represent the full stress state; one needs to know all components of the stress tensor.

Figure 11:
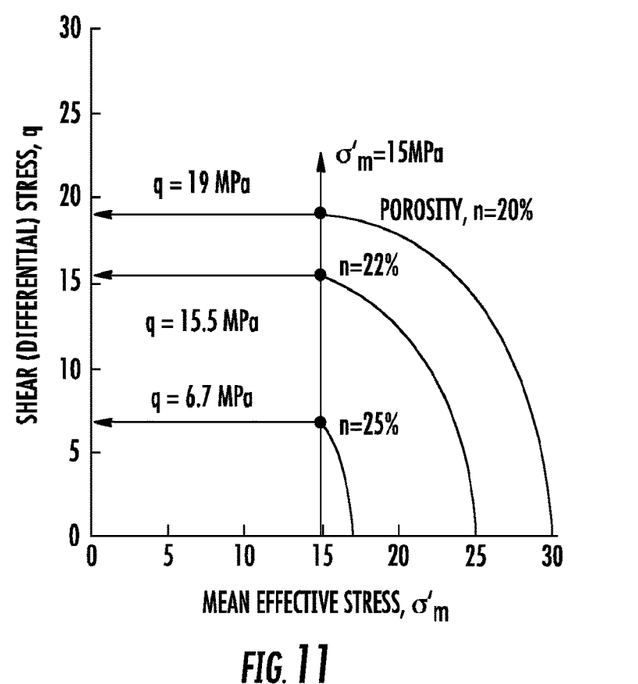
FIG. 11 illustrates exemplary relationships of the porosity (n) to shear stress (q) and mean effective stress ($\sigma'_m$).

FIG. 11 illustrates exemplary relationships of the porosity (n) to shear stress (q) and mean effective stress ($\sigma'_m$). The level of porosity (n) is related to the compaction level of the sediment. For example, a lower porosity level indicates a higher level of compaction. In particular, FIG. 11 illustrates that for the same level of an exemplary mean effective stress $\sigma'_m$, different levels of shear stress q lead to different levels of porosity n, or compaction levels.

Figure 12:
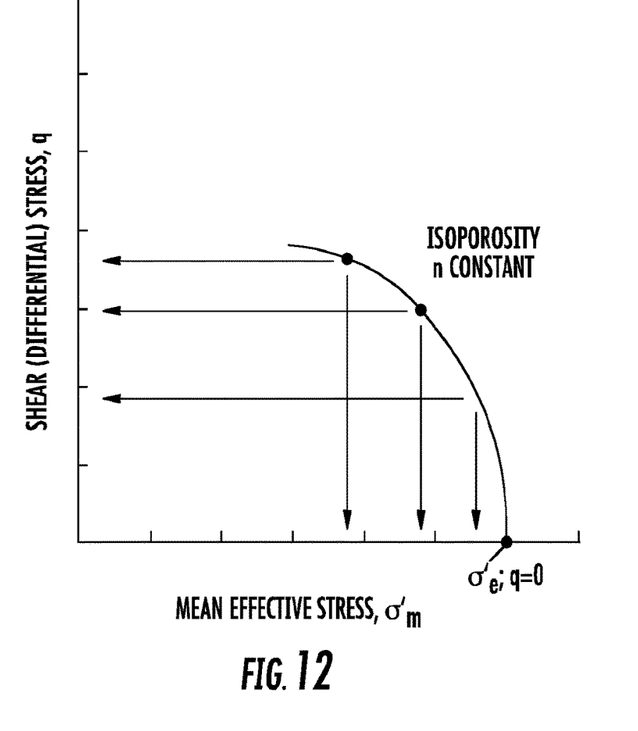
FIG. 12 illustrates exemplary relationships of the shear stress (q) and mean effective stress ($\sigma'_m$) for one particular porosity shown in FIG. 11 and the equivalent effective stress for that porosity.

FIG. 12 illustrates that there are many combinations of mean effective stress and shear stress values that result in the same porosity (e.g., cause the same amount of compaction). One of these combinations, the equivalent effective stress ($\sigma'_e$), results in the same amount of porosity (same amount of compaction) without the presence of shear stress (isotropic or hydrostatic compaction), or q=0. Thus, the equivalent effective stress $\sigma'_e$ is a single stress measurement that can represent all other combinations of mean effective stress and shear stress that cause the same porosity change.

Porosity changes and pore pressure anomalies are interrelated, because pore fluids are relatively incompressible, and hence any rapid change in volume of pores (porosity) will lead to a pressure change.

Therefore, the equivalent effective stress is a better representation of the stress state for pore pressure prediction, as it incorporates the contribution of both mean effective stress and shear stress in compaction.

Figure 5A:
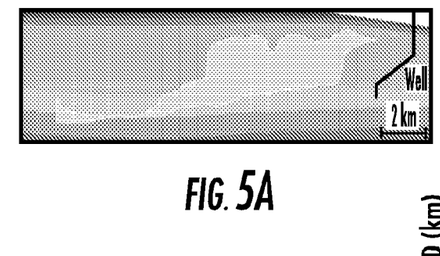
FIG. 5A illustrates an exemplary approximate location of a well relative to the salt body shown in FIG. 1, according to one implementation.
Figure 5B:
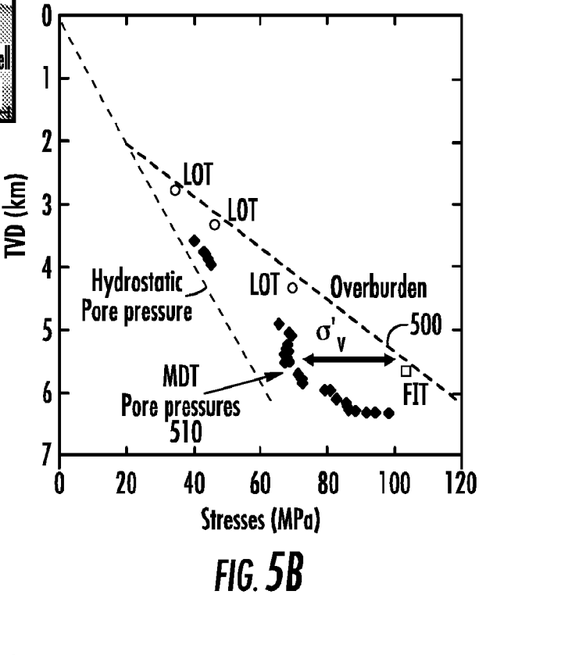
FIG. 5B illustrates exemplary stress component data measured at various depths at the well shown in FIG. 5A.

FIG. 5A illustrates an exemplary approximate location of a well relative to the salt body shown in FIG. 1, and FIG. 5B shows pore pressure data measured at various depths of the well shown in FIG. 5A. With traditional approaches, density measurements along the same well help calculate the overburden pressure, which is shown as line 500. The overburden pressure is considered the vertical total stress along the well. The Measured Direct Tests (MDT) data of pore pressure are shown on the graph as data points 510. The vertical effective stress $\sigma'_v$ is calculated as the difference between overburden pressure (line 500) and the measured pore pressure data 510 at any depth at which a pore pressure measurement is made or is available.

The depth at which the pore pressure is measured is indicated in FIG. 5B as the True Vertical Depth (TVD (km)), which is a measurement of a straight line perpendicularly downwards from the sea surface. In addition, FIG. 5B shows the results of the Formation Integrity Tests (FIT) and the Leak Off Test (LOT). These results are shown to determine the strength and integrity of a formation. These tests can comprise, for example, checking the cement seal between the casing and the formation, and then determining the pressure and/or fluid weight that the test zone below the casing can sustain. These tests may be performed in order to, for example, investigate the strength of the cement bond around the casing shoe and to ensure that no communication is established with higher formations. Additionally or alternatively, they may be performed to determine the fracture gradient around the casing shoe and therefore establish the upper limit of the primary well control for the open hole section below the current casing.

Figure 6:
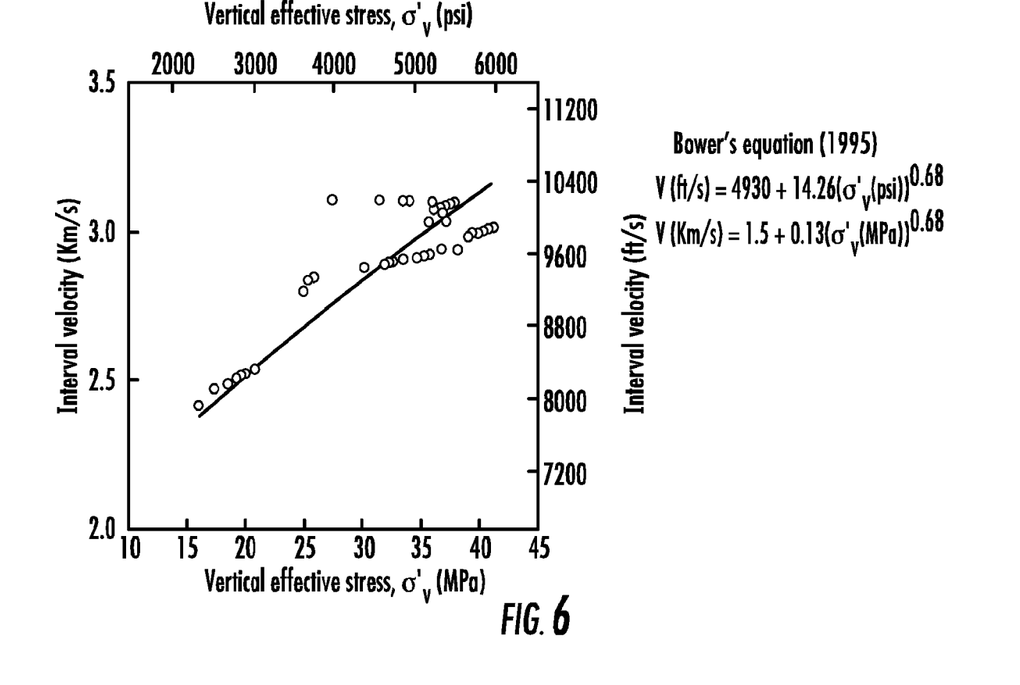
FIG. 6 shows an interval velocity-vertical effective stress relationship established between the velocity measurements along the depth of the well shown in FIG. 5A and the vertical effective stress calculated along the depth of the well from the data shown in FIG. 5B.

FIG. 6 shows the interval velocity-vertical effective stress relationship established between the velocity measurements along the well of FIG. 5A (obtained from field measurements) and the vertical effective stress along the depth of the well, as calculated using the data shown in FIG. 5B. The vertical effective stress calculated at each depth is plotted against the interval velocity measured at the same depth. This results in the black points shown in FIG. 6. Based on these points, a logarithmic regression is established, which provides the relationship between interval velocity and vertical effective stress (VES). Interval velocity ($V_{int}$) refers to seismic velocity over a depth interval z. If the rock type is uniform through that depth interval, then $V_{int}$ is equal to the formation velocity, which is the uniform seismic velocity of a particular homogeneous rock type. For a rock thickness h and a single-travel time t, the formation velocity is expressed as $v_{for}=h/t$. If the depth interval covers a number of rock beds, then the interval is equal to the average velocity (V) calculated over the distance z. The average velocity, $v^-$, can be defined as the ratio of a given depth divided by the travel time to that depth, usually assuming straight ray paths and parallel layering. Thus $v^-=z_n/t_n$, where $z_n$ is the depth of the top n layers and $t_n$ the single-travel time through those n layers. Also, $v^-=\sigma z_i/\sigma t_i$ where $z_i$ and $t_i$ are the thickness of and single-travel time through the ith layer respectively, and $\sigma$ is the total thickness and total travel time respectively of the overlying layers.

To calculate the VES across the field, velocity cube data measured in the field and the velocity-VES relationship shown in FIG. 6 are used. In particular, the velocity cube data includes velocity measurements across the target field. For each point where a measurement exists, the corresponding vertical effective stress is calculated using the velocity-VES relationship shown in FIG. 6. Then, the vertical total stress (overburden pressure) is calculated at each of these points across the field using density data along the calibration well (FIG. 5A). Then the pore pressure is calculated at every point as the difference between the vertical total stress and the vertical effective stress. Although the example above in FIG. 6 refers to using seismic velocity, sonic velocity data may be used instead or in addition to the seismic velocity.

Figure 7A:
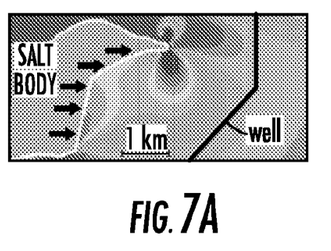
FIG. 7A illustrates results from a geomechanical model, from which the mean effective stress is calculated for the area between the well and the salt body shown in FIG. 5A.
Figure 7B:
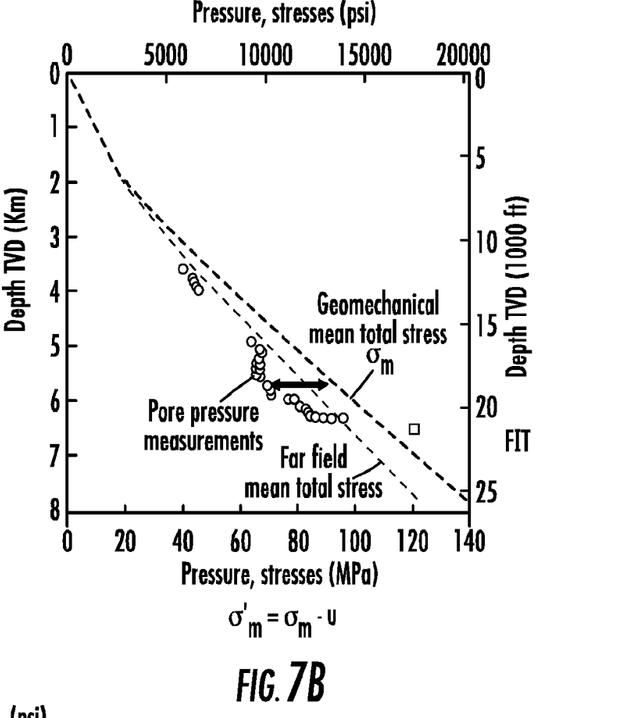
FIG. 7B illustrates the mean effective stress along the well shown in FIGS. 5A and 7A as the difference between the mean total stress calculated with the geomechanical model and the measured pore pressure along the depth of the well.

FIG. 7A illustrates results from a geomechanical model, from which the mean effective stress is calculated for the area between the well and the salt body shown in FIG. 5A. FIG. 7B illustrates the mean effective stress along the well shown in FIGS. 5A and 7A. The mean effective stress $\sigma'_m$ is calculated as the difference between the total mean stress ($\sigma'_m$) calculated with the geomechanical model and the pore pressure measurements (u) at any depth at which a pore pressure measurement is made or is available. Although the mean effective stress ($\sigma'_m$) is calculated in FIG. 7B, any other type of surrogate effective stress could be calculated using a similar method.

Figure 8:
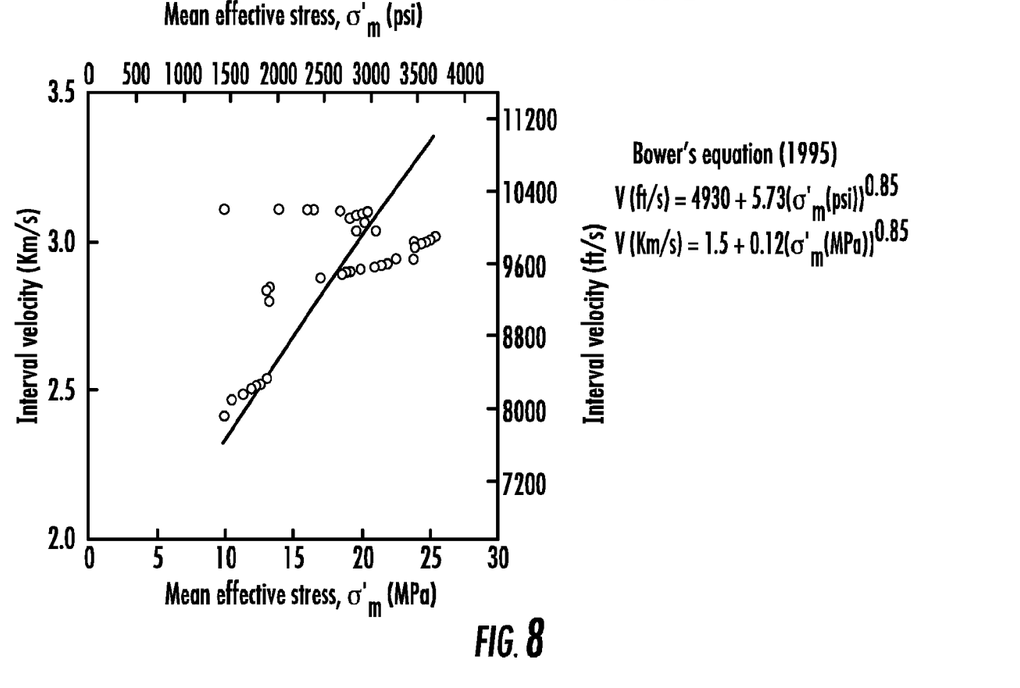
FIG. 8 shows the interval velocity-mean effective stress relationship established between the velocity measurements along the depth or the well shown in FIGS. 5A and 7A and the mean effective stress along the depth of the well, which is calculated from the data shown in FIG. 7B.

FIG. 8 shows an interval velocity-mean effective stress relationship between the velocity measurements discussed above in relation to FIG. 5B and the mean effective stress along the depth of the well, as discussed above in relation to FIG. 7B, which is based on measurements and the results of the geomechanical model. The process of establishing the relationship follows the same methodology to what described in FIG. 6.

Figure 13A:
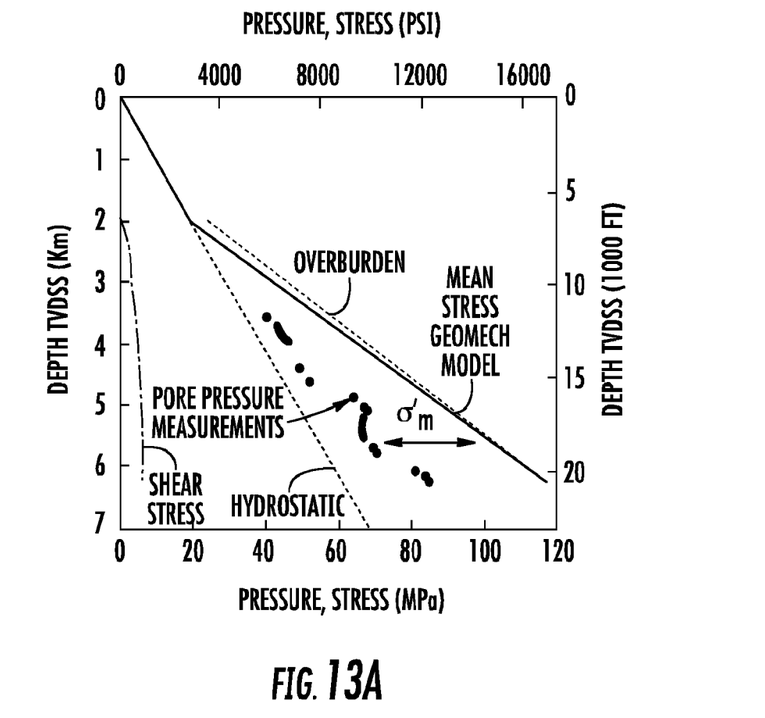
FIG. 13A illustrates the mean effective stress along the well shown in FIGS. 5A and 7A as the difference between the mean total stress calculated with the geomechanical model and the measured pore pressure along the depth of the well.
Figure 13B:
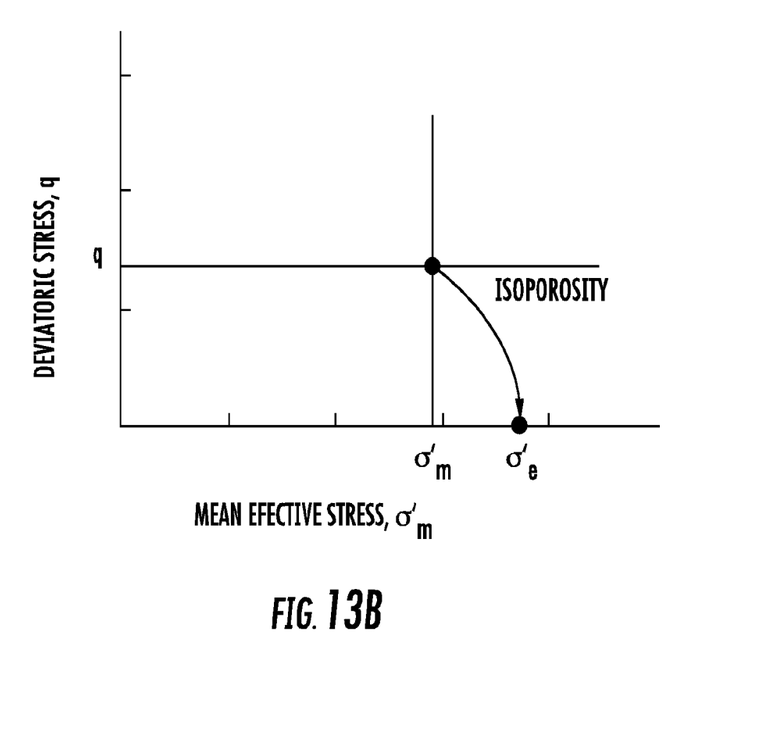
FIG. 13B illustrates exemplary calculation of the equivalent effective stress ($\sigma'_e$) from a mean effective stress ($\sigma'_m$) (calculated as in FIG. 13A) and the shear (deviatoric) stress (q) obtained from the geomechanical model for the same location as the mean effective stress. The calculation uses the isoporosity line corresponding to the porosity of the measurement location.

FIGS. 13A and 13B illustrate how the equivalent effective stress (or another type of surrogate stress) may be obtained along the depth of the well. As shown in FIG. 13A, the difference between the mean total stress calculated with the geomechanical model and the measured pore pressure stress from FIG. 5B at each depth is calculated to obtain the mean effective stress. Then, in FIG. 13B, the calculated mean effective stress is used with the shear stress calculated with the geomechanical model to calculate the equivalent effective stress for each depth. Note that in FIG. 13A, TVDSS stands for True Vertical Depth below Sea Surface, which is the same as in FIGS. 5B and 7B.

Figure 14:
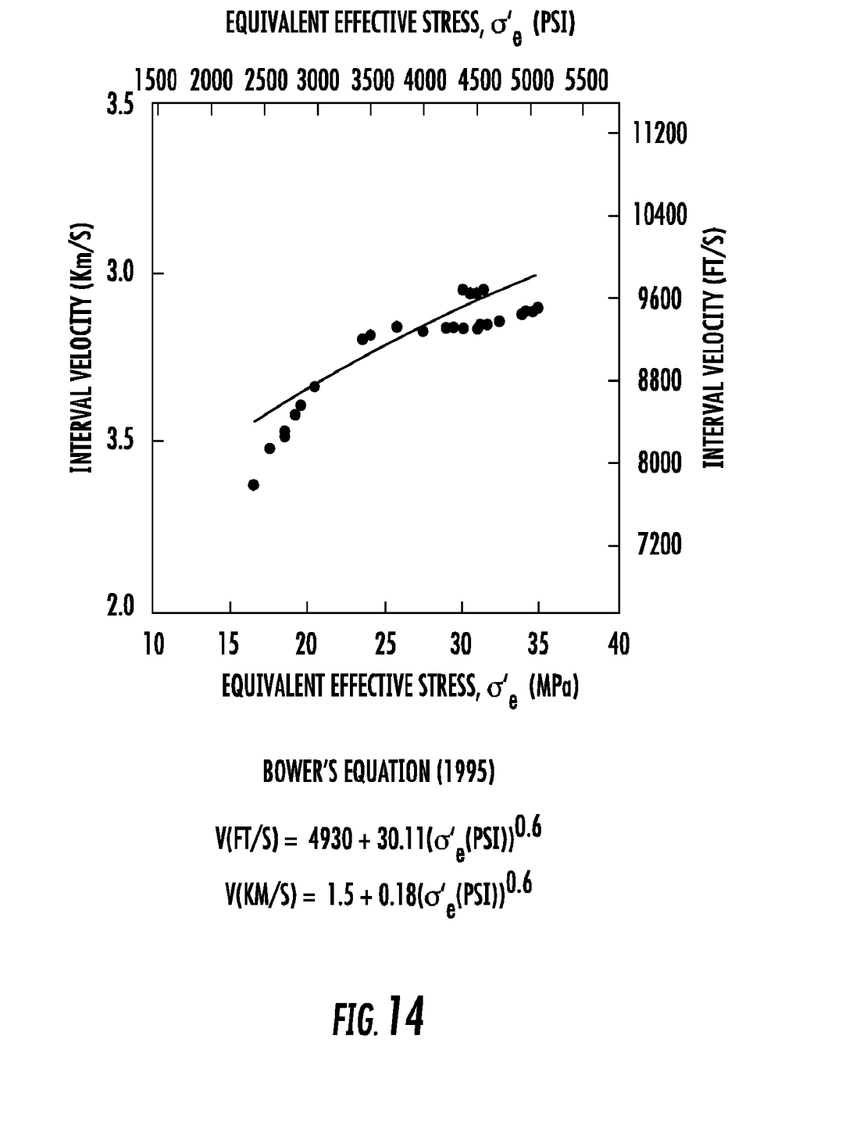
FIG. 14 illustrates an exemplary relationship between the interval velocity and the equivalent effective stress ($\sigma'_e$).

FIG. 14 illustrates a relationship between the equivalent effective stress and the interval velocity. Here an interval velocity-equivalent effective stress relationship can be established between the velocity data measurements along the well, as discussed above in relation to FIG. 5B, and the equivalent effective stress along the depth of the well, as calculated in FIG. 13B (based on measurements and the results of the geomechanical model). The process of establishing the relationship follows the same methodology to what described in FIG. 6. Next, the velocity cube data and velocity-equivalent effective stress relationship can be used to calculate the equivalent effective stress across the field at each point where velocity measurements are available. Then, at these measurement points, the mean effective stress can be calculated from the equivalent effective stress and the shear stress obtained from the geomechanical model. This can follow the reverse process of that described in FIG. 13B. The mean total stress can be obtained across the field from the geomechanical model. Finally, pore pressure can be calculated as the difference of total and mean effective stress.

Figure 9:
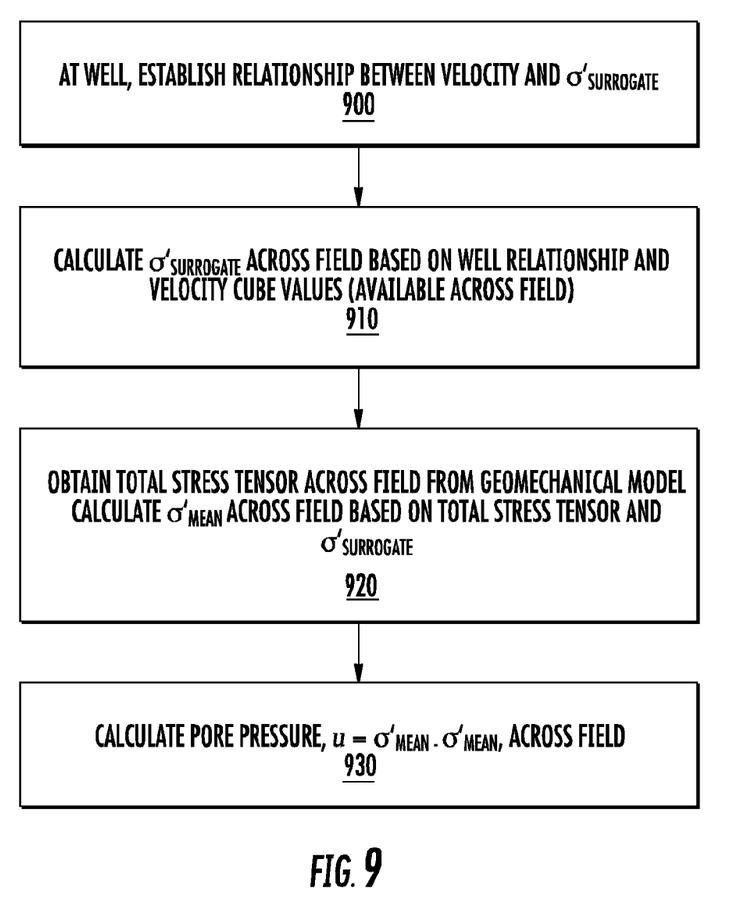
FIG. 9 shows a flowchart for calculating pore pressures across a field, according to one implementation.

FIG. 9 illustrates a flowchart for calculating pore pressures across a field, according to one implementation. Starting at 900, a relationship between seismic velocity and a surrogate effective stress at a regional well location is established. Here, seismic velocities across a target location field, as well as measurements of stress and pressure along the regional well may be data that is commonly available to energy companies exploring the target location. An equation used for this velocity-surrogate effective stress relationship is:

$$V = A + B(\sigma'_{surrogate})^C \quad \text{Eq. 1}$$

wherein V is the seismic velocity and $\sigma'_{surrogate}$ is the surrogate stress. A and B are constants calculated when establishing the mathematical relationship between velocity and surrogate effective stress, as described for the example of FIG. 6. In the example of FIG. 6, the surrogate effective stress is the vertical effective stress.

Next, in 910, the relationship from 900 can be used to populate the values of the surrogate effective stress across the target location field. In particular, the velocity cube data includes velocity measurements across the target field. These velocity measurements are used as input in the Eq. 1 above between velocity measurements and surrogate effective stress. For each point where a measurement exists, the corresponding surrogate effective stress is calculated using this Eq. 1. The result of the process is the calculation of the surrogate effective stress across the target field. Next in 920, the value of the mean effective stress across the target location field is calculated based on the surrogate effective stress and components of the stress tensor obtained from a geomechanical model. The value of the mean total stress across the target location field can be obtained from a geomechanical model. Any geomechanical model can be used here, including but not limited to static models, evolutionary models, models that apply a known stress field to a known geometry, among other examples that may be well known to someone of ordinary skill in the art.

Finally, in 930, the pore pressure across the target location field can be calculated as the difference between the mean total stress value obtained by the geomechanical model and the mean effective stress value calculated in 920:

$$u = \sigma_{mean} - \sigma'_{mean} \quad \text{Eq. 2}$$

The output of the method is values of pore pressure and values of the components of the complete stress tensor (from the geomechanical model) everywhere across the target field location.

Although the example above in FIG. 9 refers to using seismic velocity, sonic velocity data may be used instead or in addition to the seismic velocity.

Figure 10:
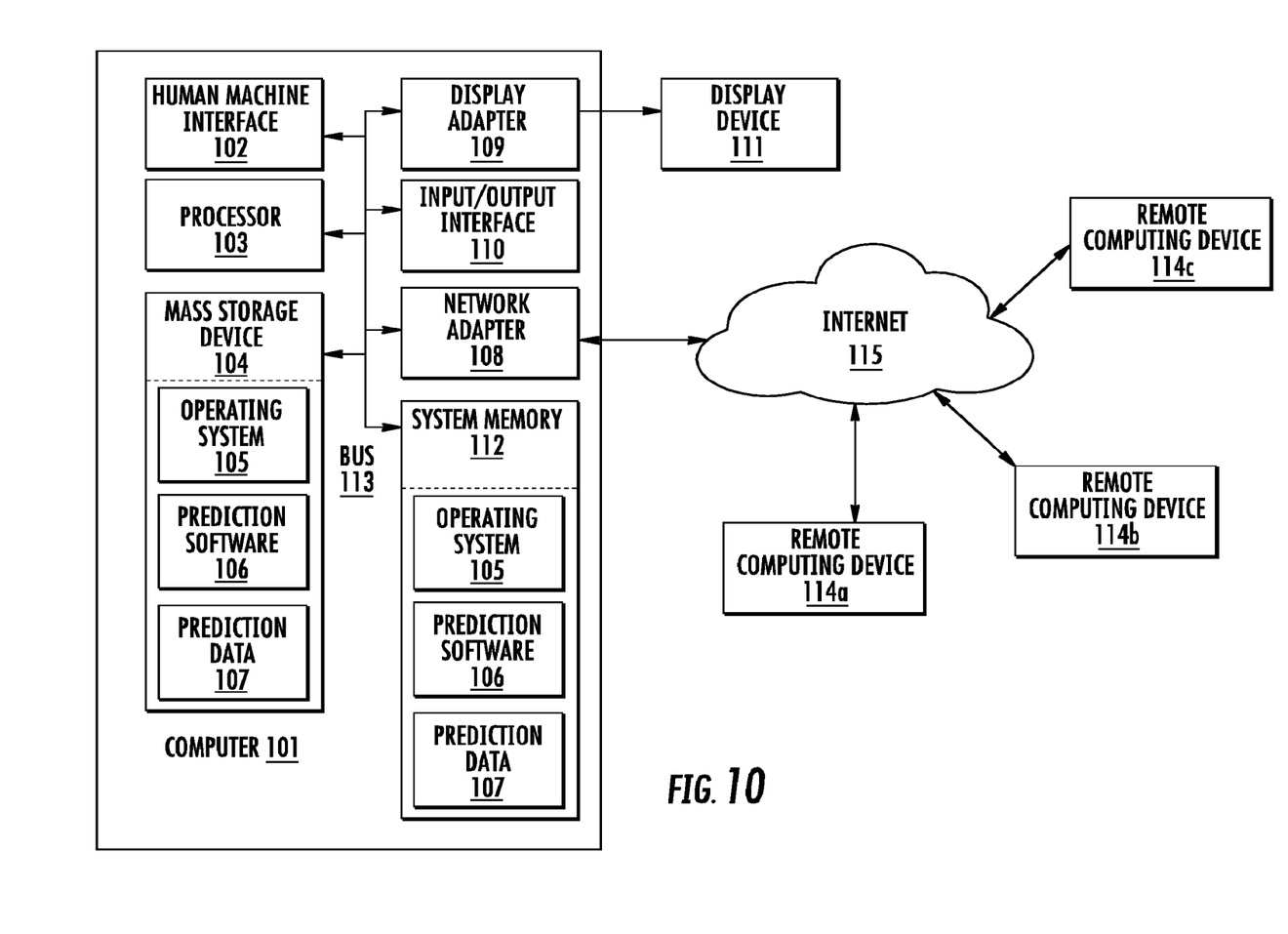
FIG. 10 is a block diagram illustrating an exemplary operating environment for performing the disclosed methods, according to one implementation.

The system has been described above as comprised of units. One skilled in the art will appreciate that this is a functional description and that the respective functions can be performed by software, hardware, or a combination of software and hardware. A unit can be software, hardware, or a combination of software and hardware. The units can comprise the prediction software 106 as illustrated in FIG. 10 and described below. In one exemplary aspect, the units can comprise a computer 101 as illustrated in FIG. 10 and described below.

FIG. 10 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 101. The components of the computer 101 can comprise, but are not limited to, one or more processors or processing units 103, a system memory 112, and a system bus 113 that couples various system components including the processor 103 to the system memory 112. In the case of multiple processing units 103, the system can utilize parallel computing.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 113, and all buses specified in this description can also be implemented over a wired or wireless network connection and each of the subsystems, including the processor 103, a mass storage device 104, an operating system 105, prediction software 106, prediction data 107, a network adapter 108, system memory 112, an Input/Output Interface 110, a display adapter 109, a display device 111, and a human machine interface 102, can be contained within one or more remote computing devices 114a,b,c at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 typically contains data such as prediction data 107 and/or program modules such as operating system 105 and prediction software 106 that are immediately accessible to and/or are presently operated on by the processing unit 103.

In another aspect, the computer 101 can also comprise other removable/non-removable, volatile/non-volatile computer storage media. By way of example, FIG. 10 illustrates a mass storage device 104 which can provide non-volatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and prediction software 106. Each of the operating system 105 and prediction software 106 (or some combination thereof) can comprise elements of the programming and the prediction software 106. Prediction data 107 can also be stored on the mass storage device 104. Prediction data 107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 101 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 103 via a human machine interface 102 that is coupled to the system bus 113, but can be connected by other interface and bus structures, such as a parallel port, game port, an IEEE 1394 Port (also known as a Firewire port), a serial port, or a universal serial bus (USB).

In yet another aspect, a display device 111 can also be connected to the system bus 113 via an interface, such as a display adapter 109. It is contemplated that the computer 101 can have more than one display adapter 109 and the computer 101 can have more than one display device 111. For example, a display device can be a monitor, an LCD (Liquid Crystal Display), or a projector. In addition to the display device 111, other output peripheral devices can comprise components such as speakers (not shown) and a printer (not shown) which can be connected to the computer 101 via Input/Output Interface 110. Any step and/or result of the methods can be output in any form to an output device. Such output can be any form of visual representation, including, but not limited to, textual, graphical, animation, audio, tactile, and the like.

The computer 101 can operate in a networked environment using logical connections to one or more remote computing devices 114a,b,c. By way of example, a remote computing device can be a personal computer, portable computer, a server, a router, a network computer, a peer device or other common network node, and so on. Logical connections between the computer 101 and a remote computing device 114a,b,c can be made via a local area network (LAN) and a general wide area network (WAN). Such network connections can be through a network adapter 108. A network adapter 108 can be implemented in both wired and wireless environments. Such networking environments are conventional and commonplace in offices, enterprise-wide computer networks, intranets, and the Internet 115.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of the prediction software 106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage or information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

What is claimed is:

1. A method for determining a well path based on predicting pore pressure in a subsurface geological environment, comprising:
   receiving velocity data for a target volume, the target volume comprising an array of measurement locations each having an associated velocity value;
   performing geomechanical modeling for the target volume, wherein said geomechanical modeling comprises obtaining a total stress tensor at each measurement location within the target volume, wherein the total stress tensor is comprised of total vertical, total horizontal and shear stresses; and performing a calibration step at a subset of the measurement locations, wherein pore pressure measurements are known at each of the subset of measurement locations and a complete stress tensor comprised of total vertical, horizontal, and shear stresses is determined at each of the subset of measurement locations using the geomechanical model, wherein the complete stress tensors are combined with the pore pressure measurements and a constraint between porosity, shear stress and mean effective stress based on an isoporosity surface is used to determine a surrogate stress at each of the subset of measurement locations, and wherein a relationship is established between velocity and surrogate stress using pairs of the velocity value and calculated surrogate stress at each of the subset of measurement locations that is applicable to all of the array of measurement locations;

for each measurement location of the array of measurement locations, determining the surrogate stress at each measurement location using the established relationship between velocity and surrogate stress;

determine for each measurement location of the array of measurement locations, a mean effective stress using the surrogate stress, an isoporosity surface corresponding to the surrogate stress and the shear stress from the geomechanical model; and determining a prediction of pore pressure values for each measurement location within the target volume as the difference between the total mean stress from the geomechanical model and the mean effective stress for each measurement location;

identifying a plurality of well paths in the target volume, wherein each well path is comprised of a plurality of measurement locations within the target volume;

determine a casing plan and mud weight long each of the well paths based on the total stress tensor and predicted pore pressure value at each of the plurality of measurement locations that comprise each well path; and select an optimal well path from among the plurality of well paths, wherein the optimal well path is selected based on one or more of cost, safety and stability of the well path.

2. The method of claim 1, wherein the subsurface comprises any one of a hydrocarbon environment, a gas environment, a liquid storage environment, and a gas storage environment.

3. The method of claim 1, wherein the total stress tensor has stress components in three directions that are independent from each other, as well as the shear components.

4. The method of claim 1, wherein determining the prediction of pore pressure values comprises analyzing loading data having both non-zero horizontal and vertical components that are independent from each other, as well as the shear components.

5. The method of claim 1, wherein the geomechanical modeling comprises analyzing loading history data and generating simulated response data of the geological environment based on the loading history data.

6. The method of claim 1, wherein the geological environment comprises at least one basin with a complex geologic history.

7. The method of claim 1, wherein the geological environment comprises at least one of a salt body, a shale formation, a continental margin slope, an extensional terrain, a fault zone, normal faults, reverse faults and strike/slip zones, a thrust belt, a folded area, a fractured area and unconformities.

8. The method of claim 1, wherein the target volume comprises a target field.

9. The method of claim 1, wherein the velocity data comprises seismic and/or sonic velocity data.

10. A non-transitory computer-readable storage medium having computer-executable instructions stored thereon for determining a well path based on predicting pore pressure in a subsurface geological environment, wherein when executed by a computing device, cause the computing device to:

receive velocity data for a target volume, the target volume comprising an array of measurement locations each having an associated velocity value;

perform geomechanical modeling for the target volume, wherein said geomechanical modeling comprises obtaining a total stress tensor at each measurement location within the target volume, wherein the total stress tensor is comprised of total vertical, total horizontal and shear stresses;

perform a calibration step at a subset of the measurement locations, wherein pore pressure measurements are known at each of the subset of measurement locations and a complete stress tensor comprised of total vertical, horizontal, and shear stresses is determined at each of the subset of measurement locations using the geomechanical model, wherein the complete stress tensors are combined with the pore pressure measurements and a constraint between porosity, shear stress and mean effective stress based on an isoporosity surface is used to determine a surrogate stress at each of the subset of measurement locations, and wherein a relationship is established between velocity and surrogate stress using pairs of the velocity value and calculated surrogate stress at each of the subset of measurement locations that is applicable to all of the array of measurement locations;

for each measurement location of the array of measurement locations, determine the surrogate stress at each measurement location using the established relationship between velocity and surrogate stress;

determine for each measurement location of the array of measurement locations, a mean effective stress using the surrogate stress, a corresponding isoporosity surface and the shear stress from the geomechanical model; and determine a prediction of pore pressure values at each measurement location within the target volume as the difference between the total mean stress from the geomechanical model and the mean effective stress for each measurement location;

identifying a plurality of well paths in the target volume, wherein each well path is comprised of a plurality of measurement locations within the target volume;

determine a casing plan and mud weight along each of the well paths based on the total stress tensor and predicted pore pressure value at each of the plurality of measurement locations that comprise each well path; and select an optimal well path from among the plurality of well paths, wherein the optimal well path is selected based on one or more of cost, safety and stability of the well path.

11. The non-transitory computer-readable storage medium of claim 10, wherein the subsurface comprises any one of a hydrocarbon, a gas environment, a liquid storage environment, and a gas storage environment.

12. The non-transitory computer-readable storage medium of claim 10, wherein the total stress tensor has stress components in three directions that are independent from each other, as well as the shear components.

13. The non-transitory computer-readable storage medium of claim 10, wherein the instructions to determine the prediction of pore pressure values further comprises analyzing loading data having both non-zero horizontal and vertical components that are independent from each other, as well as the shear components.

14. The non-transitory computer-readable storage medium of claim 10, wherein the instructions to perform the geomechanical modeling includes analyzing loading history data and generating simulated response data of the geological environment based on the loading history data.

15. The non-transitory computer-readable storage medium of claim 10, wherein the geological environment comprises at least one basin with a complex geologic history.

16. The non-transitory computer-readable storage medium of claim 10, wherein the geological environment comprises at least one of a salt body, a shale formation, a continental margin slope, an extensional terrain, a fault zone, normal faults, reverse faults and strike/slip zones, a thrust belt, a folded area, a fractured area and unconformities.

17. The non-transitory computer-readable storage medium of claim 10, wherein the target volume comprises a target field.

18. The non-transitory computer-readable storage medium of claim 10, wherein the velocity data comprises seismic and/or sonic velocity data.

\* \* \* \* \*